Jan. 12, 1960   E. SCHASCHL ET AL   2,921,210
HYDROGEN DIFFUSION DETECTION APPARATUS
Filed Sept. 30, 1957

INVENTORS
GLENN A. MARSH
BY EDWARD SCHASCHL

ATTORNEY

United States Patent Office 2,921,210
Patented Jan. 12, 1960

2,921,210

HYDROGEN DIFFUSION DETECTION APPARATUS

Edward Schaschl and Glenn A. Marsh, Crystal Lake, Ill., assignors to The Pure Oil Company, Chicago, Ill., a corporation of Ohio Application September 30, 1957, Serial No. 687,001

6 Claims. (Cl. 313—7)

This invention relates to a new and useful apparatus for detecting the diffusion of hydrogen through metals, and more particularly to an apparatus which utilizes an electron tube having a hydrogen-permeable shell connected in a suitable electric circuit, for detecting changes in operation of the tubes in response to the presence of hydrogen therein.

In fluids which contain water or acidic materials, corrosion of metals is often accompanied by the evolution of small amounts of hydrogen. An intermediate step involves the formation of atomic hydrogen at the surface of the metal. Under certain conditions some of this atomic hydrogen readily diffuses into metals and may result in hydrogen embrittlement of such metals. This is a particularly serious problem in oil wells. Since the atomic hydrogen is formed by corrosion at the metal surface its formation can be prevented by use of suitable corrosion inhibitor concentrations in the corrosive environment which thereupon prevents hydrogen diffusion into the metal. Effective corrosion inhibition, however, requires the use of some indicating method or apparatus for signalling the condition where hydrogen is penetrating the metal. Previous apparatus which has been devised for detecting the diffusion of hydrogen into metals has not been sufficiently sensitive to measure accurately extremely small amounts of diffused hydrogen, or to indicate rapidly when suitable conditions exist for the diffusion of hydrogen into or through metals.

It is therefore one object of this invention to provide a new and improved apparatus for detecting with great accuracy the diffusion of very small amounts of hydrogen through metals.

Another object of this invention is to produce an improved vacuum tube of high sensitivity for use in hydrogen-diffusion detecting apparatus.

A feature of this invention is a provision of a vacuum tube having a closed-end hollow shell of a material highly permeable to hydrogen, and having a very thin layer of a corrodible metal less noble than hydrogen thereon.

Another feature of this invention is the provision of an improved apparatus for detecting the diffusion of hydrogen through metal and which measures the cathode-plate current flow against a high positive bias on the screen-grid of a vacuum tube to indicate the conductance of the tube attributable to ionized hydrogen therein.

Other objects and features of this invention will become apparent from time to time throughout the specification and claims as hereinafter related.

Figure 1:
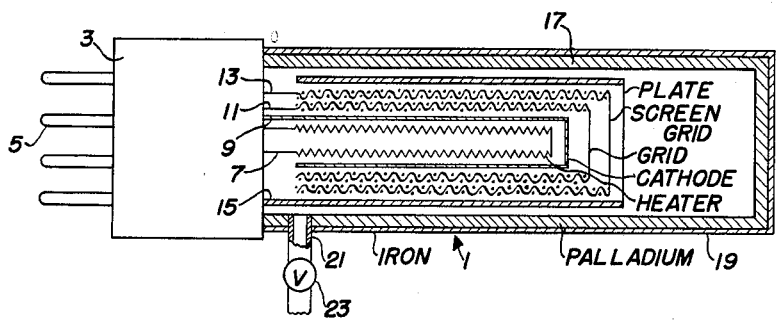
Figure 2:
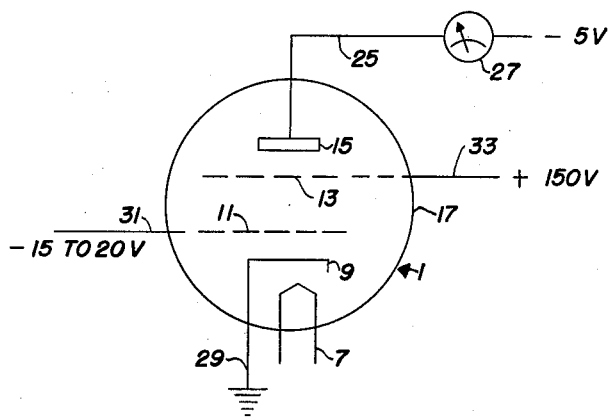

In the accompanying drawings, to be taken as part of the specification, there is clearly and fully illustrated a preferred embodiment of this invention, in which drawings, Fig. 1 is a view in section of a vacuum tube adapted for use in detecting the diffusion of hydrogen through metal, and Fig. 2 is a diagrammatic view of the electrical connections to the tube shown in Fig. 1 for detecting the diffusion of hydrogen through metal.

This invention is based upon our discovery that a vacuum tube containing cathode, plate, and grid elements enclosed by a shell evacuated to a high vacuum, which shell is of a material highly permeable to hydrogen and having a thin coating of corrodible metal thereon, may be used to detect the diffusion of hydrogen through the metal. The tube is connected in a suitable energizing circuit with a high positive grid bias to prevent flow to the plate. If hydrogen has diffused into the tube, the hydrogen is ionized by collision with electrons flowing through the tube. The positively charged hydrogen ions which are thus produced move to the plate and conduct current thereto. The amount of current conducted to the plate is a measure of the extent of ionization of hydrogen in the tube and thus an indication of the exposure of the tube to conditions favorable for the formation of hydrogen at the outside surface and diffusion of the hydrogen through the metal. The metal coating on the tube is reactive with corrosive materials (e.g., $H_2O$, $H_2S$, $HCl$, etc.) to generate atomic hydrogen at the surface of the tube as one step in the corrosion process. Under certain conditions, the atomic hydrogen readily diffuses into the tube and indicates the presence of conditions which can be destructive to the metal.

Referring to the drawings by numerals of reference, and more particularly to Fig. 1, there is shown in longitudinal section electron tube 1 having insulating base 3 and electrical connector prongs 5 thereon. The base 3 supports cathode heater 7, cathode 9, control-grid 11, screen-grid 13, and plate 15, which are connected to prongs 5 for connection in an electrical circuit. Electron tube 1 has shell 17 enclosing the various elements of the tube and sealed to base 3. Shell 17 is a hollow, closed-end, tubular member of a material highly permeable to hydrogen, such as palladium or platinum, and has a coating 19 of corrodible metal thereon. Shell 17 is also provided with an evacuation tube 21 having shut-off valve 23.

A tube which is satisfactory for this invention is a 6V6 tetrode, radio tube, equipped with a thin shell of palladium, approximately 0.025 inch thick replacing the manufacturer's painted steel shell, and having a thin chemically or electrically plated layer of iron about 0.0005 inch thick thereon. The layer 19 of iron need not cover the entire surface of the tube that is exposed to the corrosive environment. A more sensitive tube is obtained, however, when the iron layer covers the entire tube.

In Fig. 2, the electron tube 1 is shown with the electrical connections arranged for the detection of diffusing hydrogen. The tube is connected with heater 7 in an independent heating circuit. Cathode 9 is connected as at 29 to ground. Plate 15 is connected by line 25 to any suitable D.C. power source to maintain the plate at a low negative potential, preferably $-5$ v. Line 25 has ammeter 27 connected therein to measure flow of current from plate 15. Control grid 11 is connected as at 31 to a power source providing a moderately high negative bias, preferably about $-15$ to $-20$ v. Screen-grid 13 is connected as at 33 to a relatively high positive voltage, preferably about $+150$ v.

When the tube is connected in this manner, the electrons emitted by cathode 9 are controlled by grid 11 and are collected on screen-grid 13. If the tube is exposed to a medium in which atomic hydrogen is produced, e.g., by reaction of iron with $H_2O$, $H_2S$ or $HCl$ etc., the hydrogen may diffuse into the evacuated tube. Electrons flowing from cathode 9 to screen-grid 13 collide with and ionize any diffused hydrogen present within the tube, thus producing positively charged hydrogen ions which are attracted to and collected on plate 15. The flow of hydrogen ions to plate 15 causes current to flow through line 25 which is indicated on ammeter 27. The magnitude of the current flowing through line 25 as indicated on ammeter 27 is a measure of the amount of current conducted by hydrogen ions in the electron tube and thus a measure of the amount of hydrogen which has diffused through the shell of the tube.

The thin coating 19 of corrodible metal on the tube is provided to react with acidic materials (e.g., $H_2O$, $H_2S$, HCl, etc.) to produce atomic hydrogen at the surface of the tube for detection by the tube circuit to indicate the presence of corrosive conditions conducive to diffusion of hydrogen into the metal. The corrodible metal must be less noble than hydrogen, and may, for example, be selected from the group consisting of iron and ferrous alloys. It is preferably the material of which the vessel, pipe, etc., in which the corrosive environment under study is contained is fabricated. The supporting tube is preferably formed of palladium or platinum to provide a high permeability to hydrogen and a greater sensitivity of measurement to the tube. This electron tube may be used for intermittent measurement of diffusing hydrogen by periodic exposure of the tube to conditions in which hydrogen is produced. The tube may then be periodically connected in the manner indicated for measurement of the amount of hydrogen in the tube. If desired, the tube may also be used to measure diffusing hydrogen continuously by maintaining the electrical connections as indicated and exposing the tube continuously to conditions which are productive of hydrogen.

When the hydrogen concentration within the tube reaches a level which destroys the high vacuum and makes the tube inoperative, the tube may be re-evacuated by opening valve 23 and connecting outlet connection 21 to a vacuum pump. After the tube has been re-evacuated it may again be used for detection of diffusing hydrogen. Similarly the coating 19 of corrodible metal may be reapplied from time to time as may be necessitated by corrosion of the coating.

Having thus fully and completely described our invention, including a specific operating embodiment thereof, we wish it understood that within the scope of the appended claims this invention may be practiced otherwise than as specifically described.

What is claimed is:

1. An electron tube comprising cathode, plate, and grid elements supported on an insulated base and enclosed by a shell evacuated to a high vacuum, in which said shell comprises a hollow, closed-end tube of a material highly permeable to hydrogen and having a thin external coating of corrodible metal, less noble than hydrogen, thereon.

2. An electron tube according to claim 1 in which said hydrogen-permeable material is of the class consisting of platinum and palladium.

3. An electron tube according to claim 1 in which said corrodible metal is selected from the group consisting of iron and ferrous alloys.

4. An electron tube according to claim 1 in which said corrodible metal is iron.

5. An electron tube according to claim 1 in which said shell has an outlet connection for re-evacuation of the tube after extensive exposure to hydrogen.

6. An electron tube comprising cathode, plate, control-grid, and screen-grid elements supported on an insulated base and enclosed by a shell evacuated to a high vacuum, in which said shell comprises a hollow, closed-end tube of palladium having a thin external layer of iron plated thereon.

References Cited in the file of this patent

UNITED STATES PATENTS

| | | |
|---|---|---|
| 1,566,279 | King | Dec. 22, 1925 |
| 2,400,940 | McCollum | May 28, 1946 |
| 2,790,324 | Babb | Apr. 30, 1957 |